United States Patent [19]

Hirano et al.

[11] Patent Number: 5,568,325
[45] Date of Patent: Oct. 22, 1996

[54] ACHROMATIC LENS SYSTEM

[75] Inventors: Hiroyuki Hirano; Takayuki Ito, both of Tokyo, Japan

[73] Assignee: Asahi Kogaku Kogyo Kabushiki Kaisha, Tokyo, Japan

[21] Appl. No.: 295,091

[22] Filed: Aug. 24, 1994

[30]   Foreign Application Priority Data

Aug. 25, 1993 [JP] Japan .................................. 5-210416
Oct. 5, 1993 [JP] Japan .................................. 5-249214

[51] Int. Cl.$^6$ .................................................. G02B 9/14
[52] U.S. Cl. ......................... 359/785; 359/786; 359/787; 359/788
[58] Field of Search ................................. 359/797, 796, 359/784, 785, 786, 787, 788, 789, 790, 791, 792

[56]       References Cited

U.S. PATENT DOCUMENTS

| | | | |
|---|---|---|---|
| 2,628,532 | 2/1953 | Baker | 359/797 |
| 2,768,555 | 10/1956 | Knutti | 359/797 |
| 5,103,342 | 4/1992 | Kataoka | 359/674 |

FOREIGN PATENT DOCUMENTS

| | | |
|---|---|---|
| 3-96912 | 4/1991 | Japan . |
| 5142468 | 6/1993 | Japan . |

Primary Examiner—Georgia Y. Epps
Assistant Examiner—Dawn-Marie Bey
Attorney, Agent, or Firm—Greenblum & Bernstein, P.L.C.

[57]            ABSTRACT

An achromatic lens system includes in order, from the object side, a front lens group, a chromatic aberration correcting lens group, and a rear lens group. Aberrations, including spherical aberration, coma, astigmatism, curvature of image, as well as axial chromatic aberration of wavelengths from green to red, are substantially corrected by the front lens group and the rear lens group. The axial chromatic aberration of the wavelength blue, caused by the front lens group and the rear lens group, is corrected by the chromatic aberration correcting lens group.

29 Claims, 6 Drawing Sheets

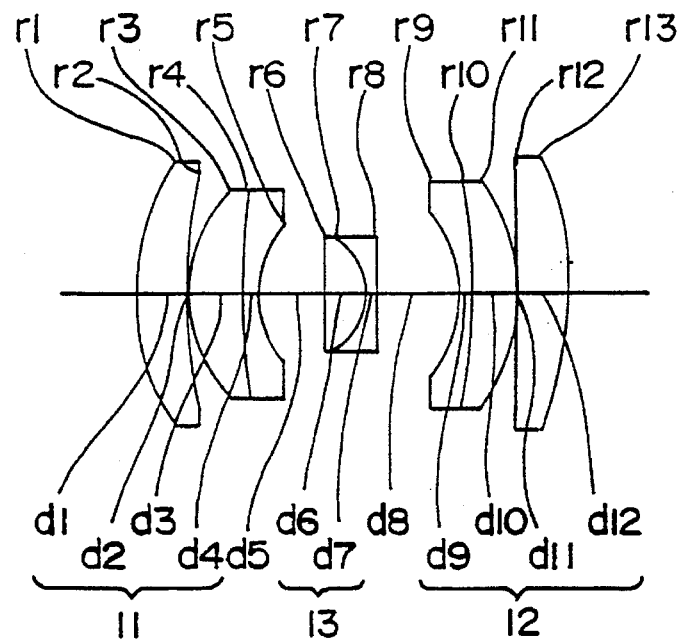
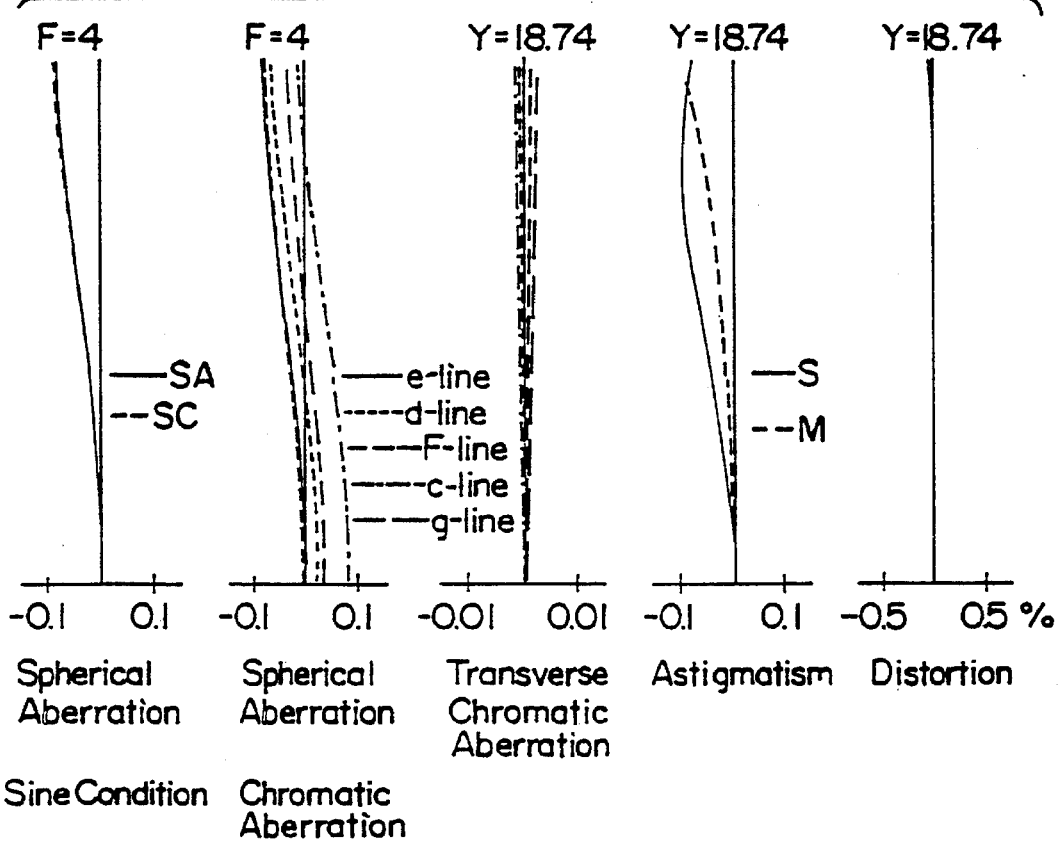

ACHROMATIC LENS SYSTEM

BACKGROUND OF THE INVENTION

1. Field of the Invention

The present invention relates to an achromatic lens system, and more precisely relates to a color image reading lens system for office supplies.

2. Description of the Related Art

There is known an achromatic lens system comprised of a special low-dispersion glass which is however expensive, easily cracked, and easily influenced by a change in the ambient temperature.

There is also known an achromatic lens system using no low-dispersion glass, as disclosed for example in Japanese Un-examined Patent Publication Nos. 3-96912 or 5-142468 in which a chromatic aberration correcting lens is provided within the lens system. However, the optical arrangement disclosed in JPP '912 in which a cemented lens and a plane-parallel plate are interchanged to achromatize three wavelengths is complicated. In the optical arrangement disclosed in JPP '468, the range of wavelength (wavelength band) to be achromatized is relatively narrow, i.e., within 486 nm (F-ray) to 656 nm (C-ray).

SUMMARY OF THE INVENTION

It is an object of the present invention to provide a chromatic aberration correcting lens without using a low-dispersion glass, which can effectively correct the axial/longitudinal chromatic aberration for a wide range of wavelength, i.e., 435 nm (g-ray) to 656 nm (C-ray).

The improvement in an achromatic lens system according to the present invention is particularly addressed to the correction of blue chromatic aberration (among three colors including blue, green, and red).

To achieve the object mentioned above, according to an aspect of this present invention, there is provided a front lens group, a chromatic aberration correcting lens group and a rear lens group, arranged in this order with respect to the object side, wherein the aberrations including spherical aberration, coma, astigmatism, curvature of image as well as the axial chromatic aberration of wavelengths from green to red are substantially corrected by the front lens group and the rear lens group. The axial chromatic aberration of the wavelength blue is caused by the front lens group and the rear lens group but is corrected by the chromatic aberration correcting lens group.

According to another aspect of the present invention, there is provided an achromatic lens system comprising a chromatic aberration correcting lens group which includes therein positive and negative lenses that satisfy the following relationship;

$$|v_P - v_N| < 5.0 \quad (1)$$

$$|N_P - N_N| < 0.01 \quad (2)$$

$$1 < (\Delta\theta(g,F)_P / \Delta\theta(g,F)_N) < 10 \quad (3)$$

wherein $v_P$: Abbe's number of the d-line of the positive lens of the chromatic aberration correcting lens group;

$v_N$: Abbe's number of the d-line of the negative lens of the chromatic aberration correcting lens group;

$N_P$: refractive index of the d-line of the positive lens of the chromatic aberration correcting lens group;

$N_N$: refractive index of the d-line of the negative lens of the chromatic aberration correcting lens group;

$\Delta\theta(g,F)_P$: deviation of the partial dispersion ratio of the g-F lines of the positive lens of the chromatic aberration correcting lens group, from the standard line;

$\Delta\theta(g,F)_N$: deviation of the partial dispersion ratio of the g-F lines of the negative lens of the chromatic aberration correcting lens group, from the standard line.

Note that the order of the positive and negative lenses does not matter.

According to another aspect of the present invention, the chromatic aberration correcting lens group includes therein first positive, second negative and third positive lenses that satisfy the relationship defined by the above-mentioned formulae (1), (2) and (3).

According to still another aspect of the present invention, the chromatic aberration correcting lens group includes therein first negative, second positive and third negative lenses that satisfy the relationship defined by the above-mentioned formulae (1), (2) and (3).

Preferably, in the chromatic aberration correcting lens group which is comprised of positive and negative lenses (positive, negative and positive lenses, or negative, positive and negative lenses) there is a relationship defined by the following formulae;

$$2 < f/f_{C-P} < 10 \quad (4)$$

$$|f/f_{C-P} + f/f_{C-N}| < 0.1 \quad (5)$$

wherein f: resultant focal length of the whole achromatic lens system;

$f_{C-P}$: resultant focal length of the positive lenses of the chromatic aberration correcting lens;

$f_{C-N}$: resultant focal length of the negative lenses of the chromatic aberration correcting lens.

In the case where the chromatic aberration correcting lens is comprised of positive, negative and positive lenses, or negative, positive and negative lenses, the chromatic aberration correcting lens is preferably symmetrical with respect to the center of the central lens thereof. This reduces the manufacturing cost. Moreover, upon assembling the lens system, each lens can be inserted facing in either direction.

The present disclosure relates to subject matter contained in Japanese patent application Nos. 5-210416 (filed on Aug. 25, 1993) and 5-249214 (filed on Oct. 5, 1993) which are expressly incorporated herein by reference in their entirety.

BRIEF DESCRIPTION OF THE DRAWINGS

The invention will be described below in detail with reference to the accompanying drawings, in which;

FIG. 1 is a schematic view of a lens arrangement of an achromatic lens system, according to a first embodiment of the present invention;

FIG. 2 shows diagrams of various aberrations of an achromatic lens system shown in FIG. 1;

BRIEF DESCRIPTION OF THE PREFERRED EMBODIMENT

Figure 3:
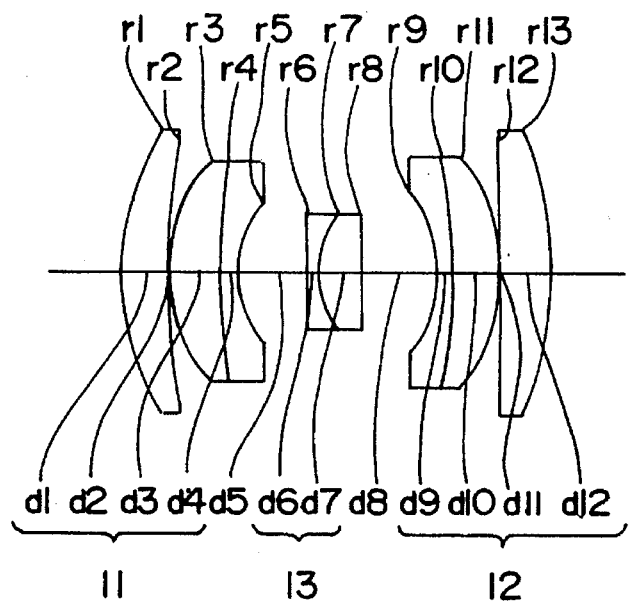
FIG. 3 is a schematic view of a lens arrangement of an achromatic lens system, according to a second embodiment of the present invention.

In an achromatic lens system according to the present invention, the aberrations including spherical aberration, coma, astigmatism, curvature of image (field curvature), etc., as well as the axial chromatic aberration of wavelengths from green to red are substantially corrected by lenses other than a chromatic aberration correcting lens, i.e., front and rear lens groups located before and after the chromatic aberration correcting lens. The chromatic aberration of blue is produced at a position shifted slightly in a positive direction with respect to the chromatic aberration of other wavelengths. The positive and negative lenses from which the chromatic aberration correcting lens is made, have substantially identical refractive indexes for the wavelengths from green to red, that are below the upper limits defined in formulae (1) and (2). For the wavelength of blue, the positive and negative lenses have slightly different refractive indexes within the limits defined in formula (3). Consequently, the variation of the chromatic aberration of blue in the negative direction is larger than the variation of the chromatic aberration of other wavelengths, so that not only can the chromatic aberration of a wide range of wavelengths be wholly corrected by the achromatic lens system, but also other aberrations can be effectively corrected.

If the values of formulae (1) and (2) exceed their respective upper limits, the correction of the chromatic aberration by the chromatic aberration correcting lens and the correction of the chromatic aberration by the front and rear lens groups before and after the chromatic aberration correcting lens will not balance, which makes it difficult to effectively correct the chromatic aberration for a wide range of wavelength.

Formulae (1) and (2) also specify the requirement for the correction of the axial chromatic aberration and the astigmatism of off-axis colors. If the values of the formulae (1) and (2) exceed their respective upper limits, no effective correction of the axial chromatic aberration and off-axis astigmatism can be expected.

Formula (3) specifies the deviation $\Delta\theta(g, F)$ of the partial dispersion ratio $\theta(g, F)$ of the blue ray (g, F-rays) from the standard line (K7-F2 standardized by Shot Inc.) for the positive and negative lenses. If the value for the ratio of formula (3) is above the upper limit, there is a large difference in the refractive indices for the wavelengths, not only blue but green to red between the positive lens and the negative lens, this means that it is difficult to balance the chromatic aberration correcting lens with the front and rear lens groups located before and after the correcting lens. Conversely, if the value of the ratio for formula (3) is smaller than the lower limit, correction of the chromatic aberration can not occur.

If the upper limit in the formula (2) is 0.001 and the upper limit in the formula (3) is 5, that is, if the formulae (2): and (3): are replaced with (2') ($|N_P-N_N|< 0.001$), and (3')($1<(\Delta\theta(g,F)_P)/(\Delta\theta(g,F)_N)<5$), respectively, this means that the lenses, which are made from a combination of different types of glass, have almost the same refractive indices for the wavelengths of red to green but have slightly different refractive indices for the wavelength of blue. Consequently, it is possible to control the correction for the chromatic aberration of the wavelength of blue only by varying the radius of curvature of the connecting surface of the chromatic aberration correcting lens depending on the state of correction of the chromatic aberration of the front and rear lens groups located before and after the chromatic aberration correcting lens, without changing the aberration of other wavelengths.

The chromatic aberration correcting lens is comprised of at least two lenses including a positive lens and a negative lens in combination. If the chromatic aberration correcting lens is comprised of two lenses, this is the smallest number of lens elements possible, but both the negative and positive lenses must have a large power, and accordingly, the radii of curvature of the opposed surfaces between the positive and negative lenses are small. Consequently, the thickness of the positive lens at the peripheral edge thereof tends to be small. This makes it difficult to produce the lenses. If the chromatic aberration correcting lens is comprised of three lenses including a first positive lens, a second negative lens and a third positive lens; or a first negative lens, a second positive lens and a third negative lens, the radii of curvature of the opposed surfaces between the lenses would be large, and accordingly, the thickness of the lenses at the peripheral edges thereof can be increased, although the number of the lens elements is increased.

The formulae (4) and (5) specify the resultant focal lengths of the positive lens(es) and the negative lens(es) in the chromatic aberration correcting lens, respectively. The chromatic aberration of blue can be made larger than the chromatic aberration of other wavelengths making the positive and negative lenses with a large power, even with a combination of different types of glass that satisfy the requirements defined by the formulae (1) through (3). Consequently, the chromatic aberration can be easily corrected.

If the value of ratio defined in the formula (4) is larger than the upper limit, the paraxial chromatic aberration can be effectively corrected, but a large amount of chromatic aberration of the marginal rays is produced so long as there is a relationship defined by the formulae (1) through (3). Conversely, if the value of ratio is smaller than the lower limit, then corrected, so long as there is a relationship defined by the formulae (1) through (3).

Formula (5) relates to a difference between the positive lens(es) power and the negative lens(es) power of the chromatic aberration correcting lens. Although the positive and negative lenses have a large power, the difference is considerably smaller, as can be seen from the value of the upper limit defined in the formula (5). If the value defined in the formula (5) is larger than the upper limit, other aberrations are produced within the chromatic aberration correcting lens in addition to the chromatic aberration. Accordingly, it is difficult to balance the other aberrations and the aberration produced within the front and rear lens groups located before and after the chromatic aberration correcting lens.

First Embodiment:

FIG. 1 shows a lens arrangement comprised of a front lens group 11 consisting of three lenses (two of which are cemented), a rear lens group 12 consisting of three lenses (two of which are cemented), and a chromatic aberration correcting lens group 13 consisting of two cemented lenses, positioned between the front lens group 11 and the rear lens group 12, according to a first embodiment of the present invention. The chromatic aberration correcting lens group 13 has lens surface Nos. r6 through r8.

Numerical data for the achromatic lens system shown in FIG. 1 is shown in Table 1 below. Diagrams of various aberrations thereof are shown in FIG. 2. In FIG. 2, "SA" designates the spherical aberration, "SC" the sine condition, "e-line", "d-line", "F-line", "C-line", and "g-line" the chromatic aberration, represented by the spherical aberration, and the transverse chromatic aberration, at the respective wavelengths, "S" the sagittal ray, and "M" the meridional ray, respectively.

In Tables and the drawings, "$F_{NO}$" designates the f-number at the infinite object distance ($\infty$), "f" the focal length, "y" the image height, "$f_B$" the back-focal distance. "M" the lateral aberration, "ri" the radius of curvature of each lens surface, "di" the lens thickness or the distance between the lenses, "$N_e$" the refractive index of the e-line, "$N_d$" the refractive index of the d-line, and "$v_d$" the Abbe number of the d-line, respectively.

TABLE 1

$F_{NO} = 4$
$f = 50.16$
$y = 18.74$
$f_B = 33.48$
$M = -0.165$

| Surface No. | r | d | $N_e$ | $N_d$ | $v_d$ |
|---|---|---|---|---|---|
| 1 | 23.000 | 4.14 | 1.80642 | 1.80100 | 35.0 |
| 2 | 65.589 | 0.18 | — | — | — |
| 3 | 14.900 | 4.20 | 1.62287 | 1.62041 | 60.3 |
| 4 | 62.439 | 1.50 | 1.74618 | 1.74000 | 28.3 |
| 5 | 10.539 | 5.73 | — | — | — |
| 6 | $\infty$ | 3.56 | 1.81264 | 1.80518 | 25.4 |
| 7 | −6.000 | 1.23 | 1.81265 | 1.80518 | 25.4 |
| 8 | $\infty$ | 7.27 | — | — | — |
| 9 | −12.074 | 1.50 | 1.67158 | 1.66680 | 33.0 |
| 10 | −41.418 | 3.80 | 1.74679 | 1.74320 | 49.3 |
| 11 | −17.000 | 0.10 | — | — | — |
| 12 | −260.000 | 4.66 | 1.72341 | 1.71999 | 50.2 |
| 13 | −29.839 | — | — | — | — |

$\theta(g,F) = (n_g - n_F)/(n_F - n_c)$
Surface No. 6
$\theta(g,F)_P = 0.6153$
$\Delta\theta(g,F)_P = 0.0150$
Surface No. 7
$\theta(g,F)_N = 0.6100$
$\Delta\theta(g,F)_N = 0.0097$ Note that "$\theta(g,F)_P$" and "$\Delta\theta(g,F)_P$" are characteristic values determined by the glass material to be used.

Second Embodiment:

FIG. 3 shows a lens arrangement of an achromatic lens system according to a second embodiment of the present invention, in which the achromatic lens system is comprised of a front lens group 11 consisting of three lenses (two of which are cemented), a rear lens group 12 consisting of three lenses (two of which are cemented), and a chromatic aberration correcting lens group 13 consisting of two cemented lenses (lens surface Nos. r6 through r8), positioned between the front lens group 11 and the rear lens group 12.

Figure 4:
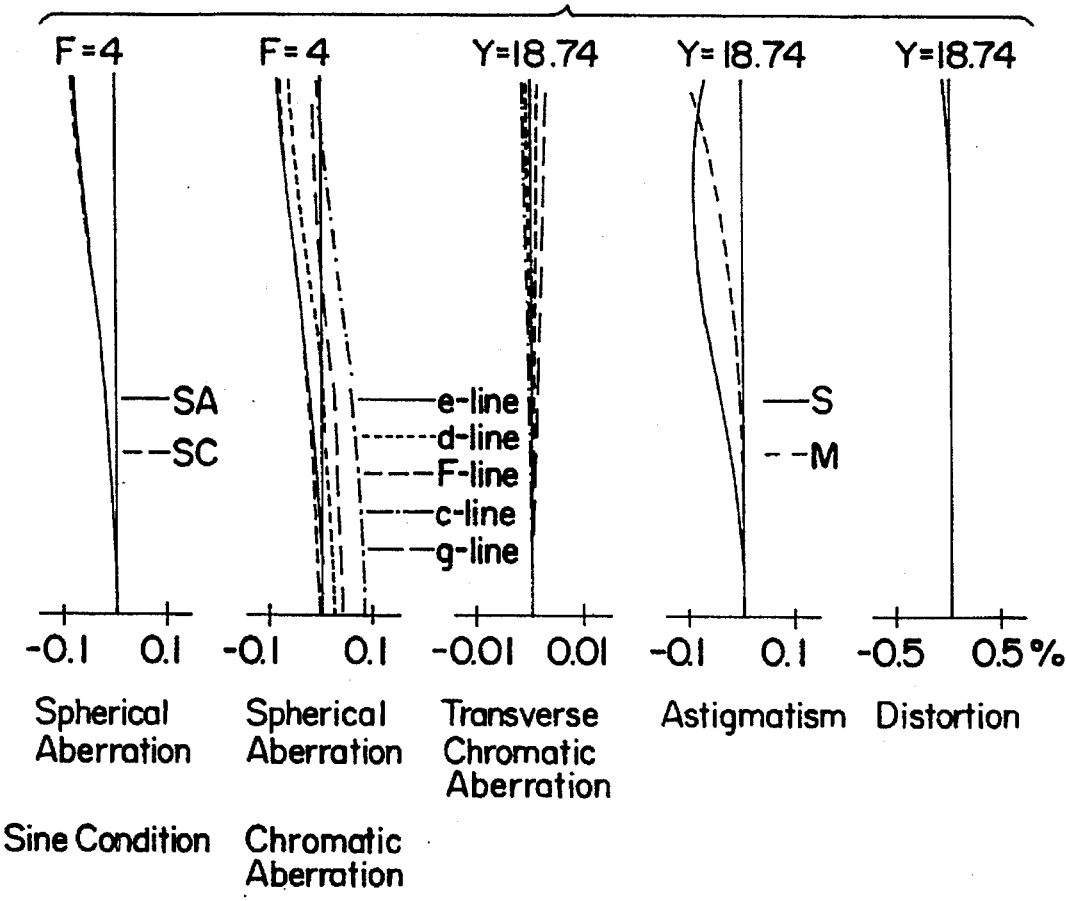
FIG. 4 shows diagrams of various aberrations of an achromatic lens system shown in FIG. 3.

Numerical data for the lens system shown in FIG. 3 is shown in Table 2 below. Diagrams of various aberrations thereof are shown in FIG. 4.

TABLE 2

$F_{NO} = 4$
$f = 48.57$
$y = 18.74$
$f_B = 32.19$
$M = -0.165$

| Surface No. | r | d | $N_e$ | $N_d$ | $v_d$ |
|---|---|---|---|---|---|
| 1 | 23.435 | 4.14 | 1.80642 | 1.80100 | 35.0 |
| 2 | 72.312 | 0.18 | — | — | — |
| 3 | 14.953 | 4.53 | 1.62286 | 1.62041 | 60.3 |
| 4 | 79.475 | 1.50 | 1.74618 | 1.74000 | 28.3 |
| 5 | 10.290 | 5.94 | — | — | — |
| 6 | $\infty$ | 1.23 | 1.79177 | 1.78470 | 26.2 |
| 7 | 9.652 | 3.56 | 1.79192 | 1.78472 | 25.7 |
| 8 | $\infty$ | 6.68 | — | — | — |
| 9 | −12.363 | 1.50 | 1.67766 | 1.67270 | 32.1 |
| 10 | −49.656 | 4.01 | 1.74679 | 1.74320 | 49.3 |
| 11 | −16.771 | 0.10 | — | — | — |
| 12 | −634.527 | 4.66 | 1.72341 | 1.71999 | 50.2 |
| 13 | −31.670 | — | — | — | — |

Figure 5:
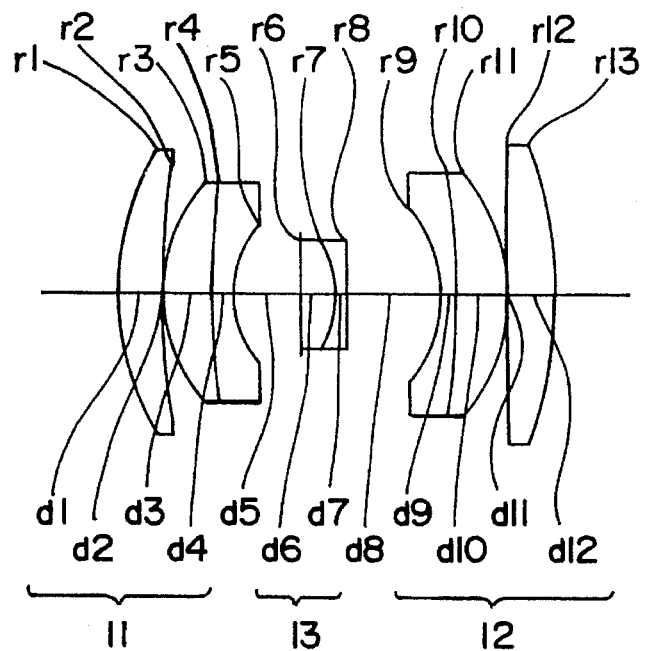
FIG. 5 is a schematic view of a lens arrangement of an achromatic lens system, according to a third embodiment of the present invention.

Surface No. 6
$\theta(g,F)_N = 0.6082$
$\Delta\theta(g,F)_N = 0.0092$
Surface No. 7
$\theta(g,F)_P = 0.6159$
$\Delta\theta(g,F)_P = 0.0160$ Third Embodiment:

FIG. 5 shows a lens arrangement of an achromatic lens system according to a third embodiment of the present invention, in which the achromatic lens system is comprised of a front lens group 11 consisting of three lenses (two of which are cemented), a rear lens group 12 consisting of three lenses (two of which are cemented), and a chromatic aberration correcting lens group 13 consisting of two cemented lenses (lens surface Nos. r6 through r8), positioned between the front lens group 11 and the rear lens group 12.

Figure 6:
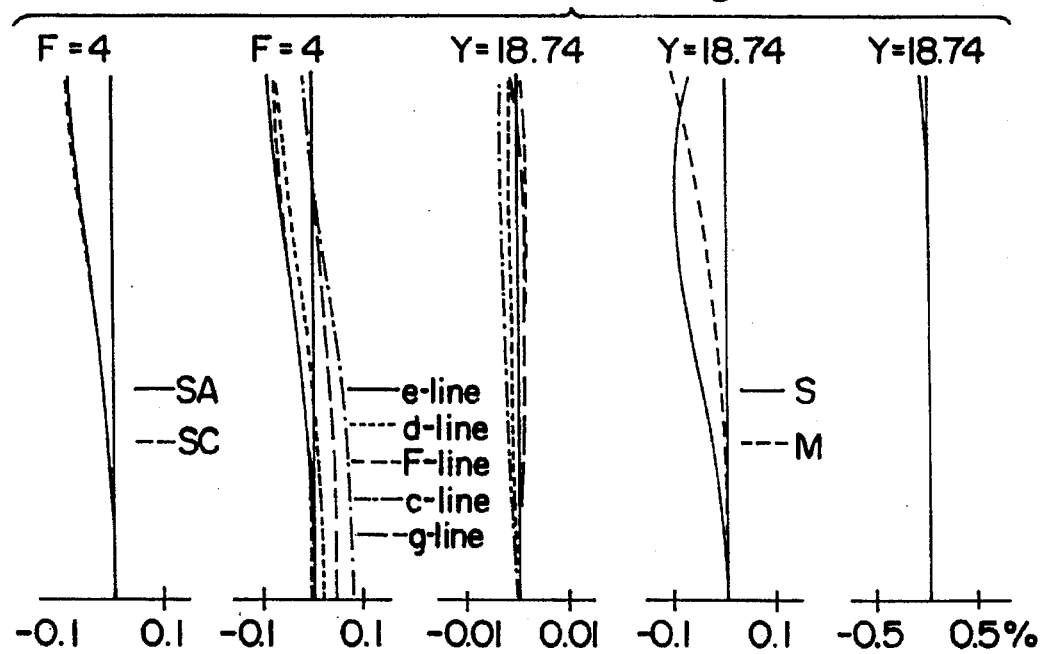
FIG. 6 shows diagrams of various aberrations of an achromatic lens system shown in FIG. 5.

Numerical data for the lens system shown in FIG. 5 is shown in Table 3 below. Diagrams of various aberrations thereof are shown in FIG. 6.

TABLE 3

$F_{NO} = 4$
$f = 49.49$
$y = 18.74$
$f_B = 29.78$
$M = -0.165$

| Surface No. | r | d | $N_e$ | $N_d$ | $v_d$ |
|---|---|---|---|---|---|
| 1 | 24.387 | 4.14 | 1.80642 | 1.80100 | 35.0 |
| 2 | 77.965 | 0.18 | — | — | — |
| 3 | 14.930 | 4.79 | 1.66103 | 1.65830 | 57.3 |
| 4 | 113.734 | 1.50 | 1.76859 | 1.76182 | 26.6 |
| 5 | 10.350 | 5.96 | — | — | — |
| 6 | $\infty$ | 2.86 | 1.81675 | 1.80834 | 22.6 |
| 7 | −10.722 | 1.23 | 1.81265 | 1.80518 | 25.4 |
| 8 | $\infty$ | 8.17 | — | — | — |
| 9 | −13.012 | 1.50 | 1.69417 | 1.68893 | 31.1 |
| 10 | −73.798 | 4.48 | 1.77621 | 1.77250 | 49.6 |
| 11 | −17.645 | 0.10 | — | — | — |
| 12 | 393.426 | 4.66 | 1.68082 | 1.67790 | 55.3 |
| 13 | −37.418 | — | — | — | — |

Surface No. 6
$\theta(g,F)_P = 0.6288$

TABLE 3-continued $F_{NO} = 4$
$f = 49.49$
$y = 18.74$
$f_B = 29.78$
$M = -0.165$

| Surface No. | r | d | $N_e$ | $N_d$ | $v_d$ |
| --- | --- | --- | --- | --- | --- |

Figure 7:
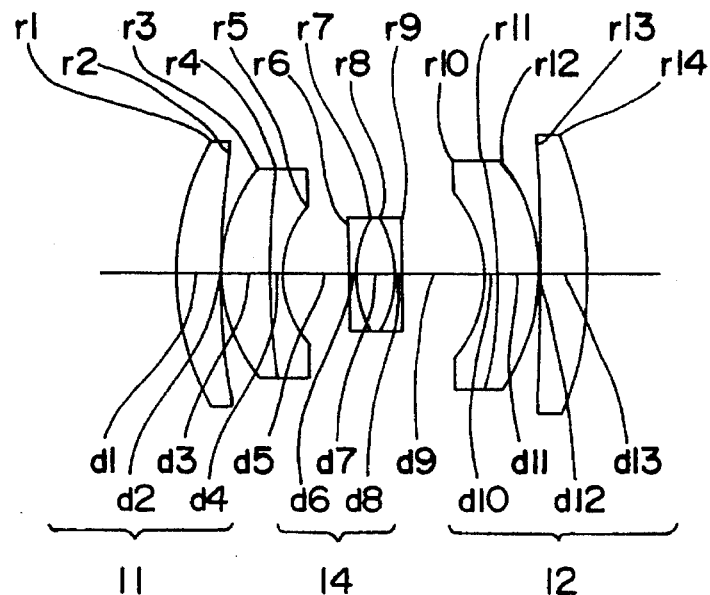
FIG. 7 is a schematic view of a lens arrangement of an achromatic lens system, according to a fourth embodiment of the present invention.

$\Delta \theta (g, F)_P = 0.0213$
Surface No. 7
$\theta (g,F)_N = 0.6100$
$\Delta \theta (g,F)_N = 0.0097$ Fourth Embodiment:

FIG. 7 shows a lens arrangement of an achromatic lens system according to a fourth embodiment of the present invention, in which the achromatic lens system is comprised of a front lens group 11 consisting of three lenses (two of which are cemented), a rear lens group 12 consisting of three lenses (two of which are cemented), and a chromatic aberration correcting lens group 14 consisting of three cemented lenses (lens surface Nos. r6 through r9), positioned between the front lens group 11 and the rear lens group 12.

Figure 8:
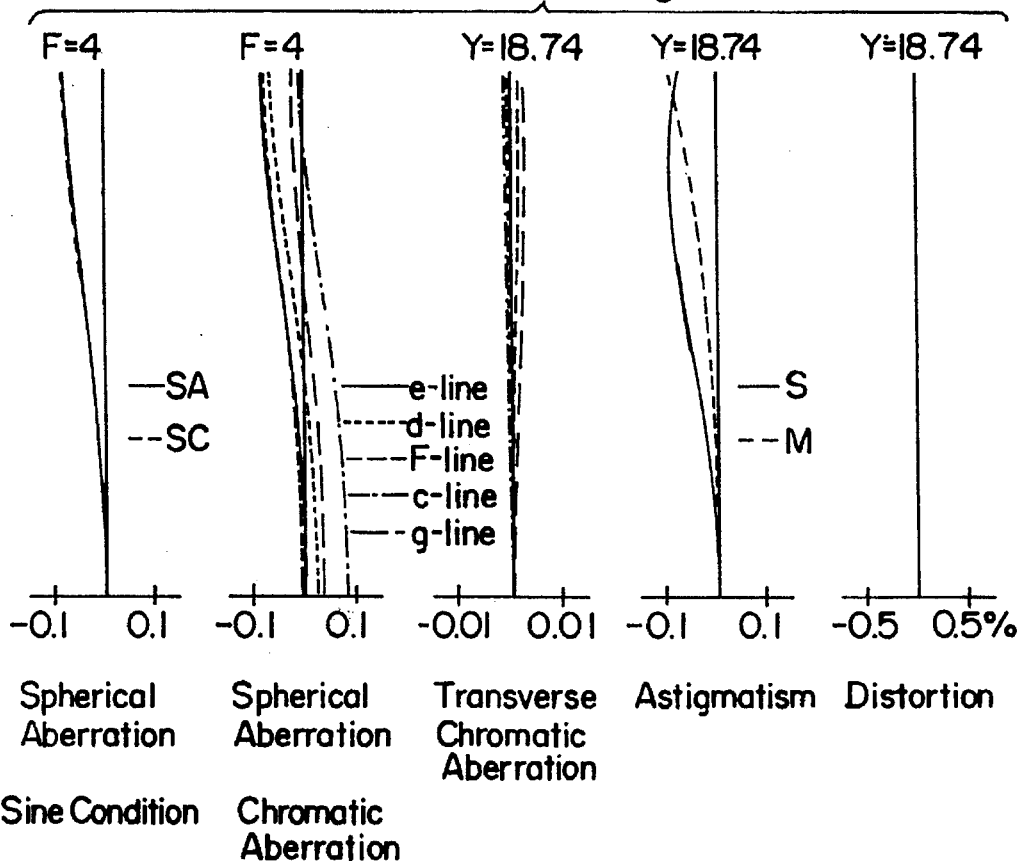
FIG. 8 shows diagrams of various aberrations of an achromatic lens system shown in FIG. 7.

Numerical data for the lens system shown in FIG. 7 is shown in Table 4 below. Diagrams of various aberrations thereof are shown in FIG. 8. The chromatic aberration correcting lens group 14 is comprised of a first negative lens, a second positive lens and a third negative lens, and is symmetrical in shape with respect to the center axis of the central lens (second positive lens).

TABLE 4

$F_{NO} = 4$
$f = 50.16$
$y = 18.74$
$f_B = 33.48$
$M = -0.165$

| Surface No. | r | d | $N_e$ | $N_d$ | $v_d$ |
| --- | --- | --- | --- | --- | --- |
| 1 | 23.000 | 4.14 | 1.80642 | 1.80100 | 35.0 |
| 2 | 65.589 | 0.18 | — | — | — |
| 3 | 14.900 | 4.20 | 1.62287 | 1.62041 | 60.3 |
| 4 | 62.439 | 1.50 | 1.74618 | 1.74000 | 28.3 |
| 5 | 10.539 | 5.73 | — | — | — |
| 6 | ∞ | 0.80 | 1.81265 | 1.80518 | 25.4 |
| 7 | 12.000 | 3.19 | 1.81264 | 1.80518 | 25.4 |
| 8 | -12.000 | 0.80 | 1.81265 | 1.80518 | 25.4 |
| 9 | ∞ | 7.27 | — | — | — |
| 10 | -12.074 | 1.50 | 1.67158 | 1.66680 | 33.0 |
| 11 | -41.418 | 3.80 | 1.74679 | 1.74320 | 49.3 |
| 12 | -17.000 | 0.10 | — | — | — |
| 13 | -260.000 | 4.66 | 1.72341 | 1.71999 | 50.2 |
| 14 | -29.639 | — | — | — | — |

Figure 9:
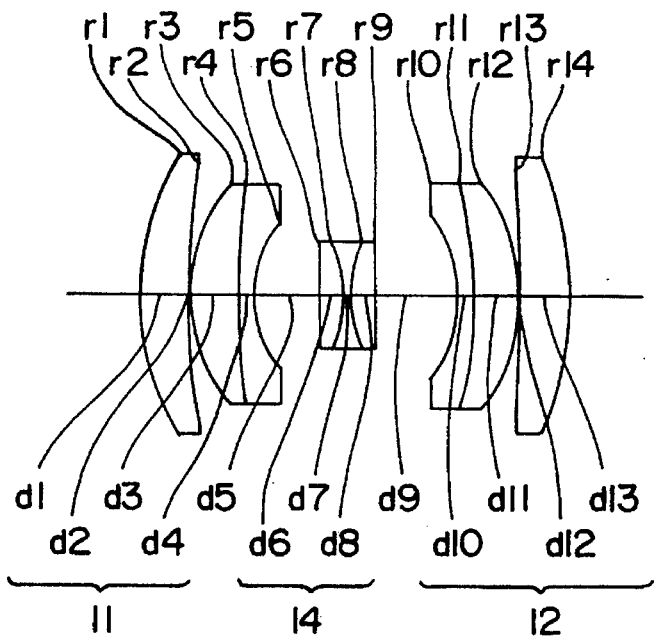
FIG. 9 is a schematic view of a lens arrangement of an achromatic lens system, according to a fifth embodiment of the present invention.

Surface No. 6
$\theta (g,F)_N = 0.6100$
$\Delta \theta (g,F)_N = 0.0097$
Surface No. 7
$\theta (g,F)_P = 0.6153$
$\Delta \theta (g,F)_P = 0.0150$
Surface No. 8
$\theta (g,F)_N = 0.6100$
$\Delta \theta (g,F)_N = 0.0097$ Fifth Embodiment:

FIG. 9 shows a lens arrangement of an achromatic lens system according to a fifth embodiment of the present invention, in which the achromatic lens system is comprised of a front lens group 11 consisting of three lenses (two of which are cemented), a rear lens group 12 consisting of three lenses (two of which are cemented), and a chromatic aberration correcting lens group 14 consisting of three cemented lenses (lens surface Nos. r6 through r9), positioned between the front lens group 11 and the rear lens group 12.

Figure 10:
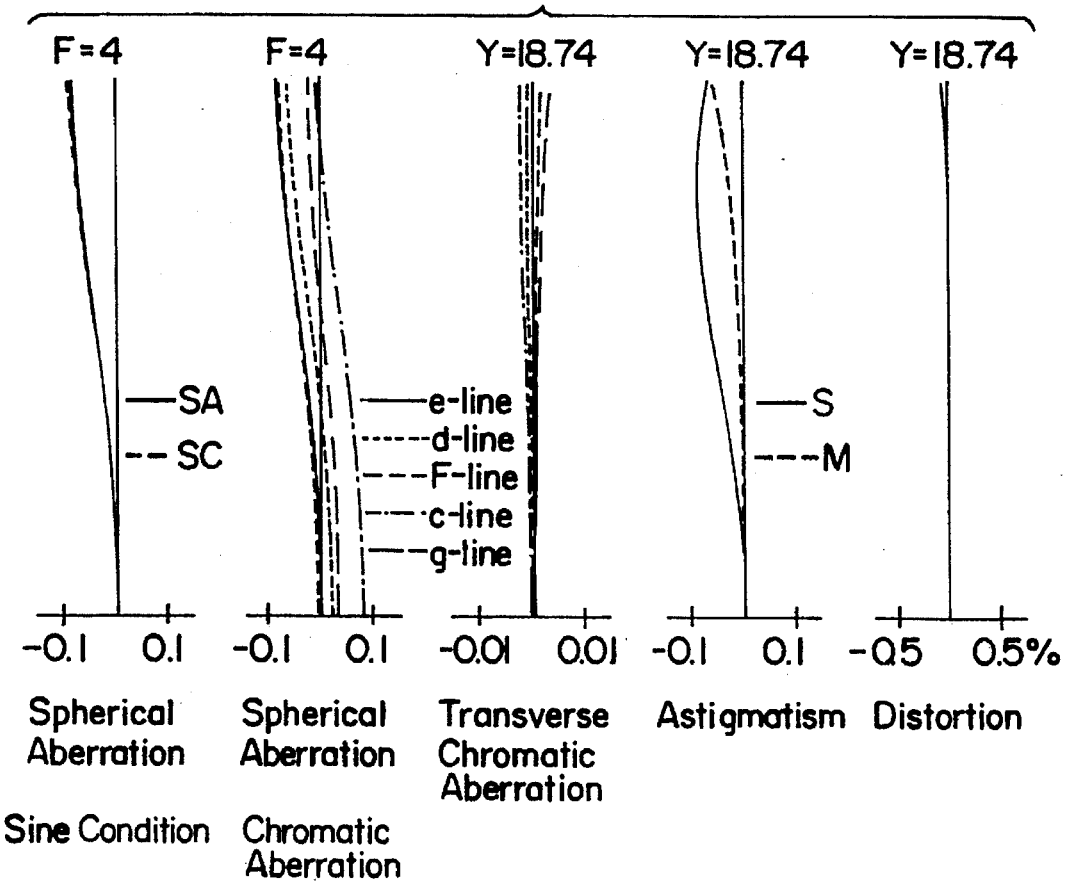
FIG. 10 shows diagrams of various aberrations of an achromatic lens system shown in FIG. 9; and, FIG. 11 is a graph of a paraxial chromatic aberration of an achromatic lens system according to a first embodiment and a paraxial chromatic aberration of an achromatic lens which is made of a single lens.

Numerical data for the lens system shown in FIG. 9 is shown in Table 5 below. Diagrams of various aberrations thereof are shown in FIG. 10. The chromatic aberration correcting lens group 14 is comprised of a first positive lens, a second negative lens and a third positive lens, and is symmetrical in shape with respect to the center axis of the central lens (second negative lens).

TABLE 5

$F_{NO} = 4$
$f = 50.17$
$y = 18.74$
$f_B = 33.48$
$M = -0.165$

| Surface No. | r | d | $N_e$ | $N_d$ | $v_d$ |
| --- | --- | --- | --- | --- | --- |
| 1 | 23.000 | 4.14 | 1.80642 | 1.80100 | 35.0 |
| 2 | 65.589 | 0.18 | — | — | — |
| 3 | 14.900 | 4.20 | 1.62287 | 1.62041 | 60.3 |
| 4 | 62.439 | 1.50 | 1.74618 | 1.74000 | 28.3 |
| 5 | 10.539 | 5.73 | — | — | — |
| 6 | ∞ | 2.00 | 1.81264 | 1.80518 | 25.4 |
| 7 | -12.000 | 0.80 | 1.81265 | 1.80518 | 25.4 |
| 8 | 12.000 | 2.00 | 1.81264 | 1.80518 | 25.4 |
| 9 | ∞ | 7.27 | — | — | — |
| 10 | -12.074 | 1.50 | 1.67158 | 1.66680 | 33.0 |
| 11 | -41.418 | 3.80 | 1.74679 | 1.74320 | 49.3 |
| 12 | -17.000 | 0.10 | — | — | — |
| 13 | -260.000 | 4.66 | 1.72341 | 1.71999 | 50.2 |
| 14 | -29.839 | — | — | — | — |

Figure 11:
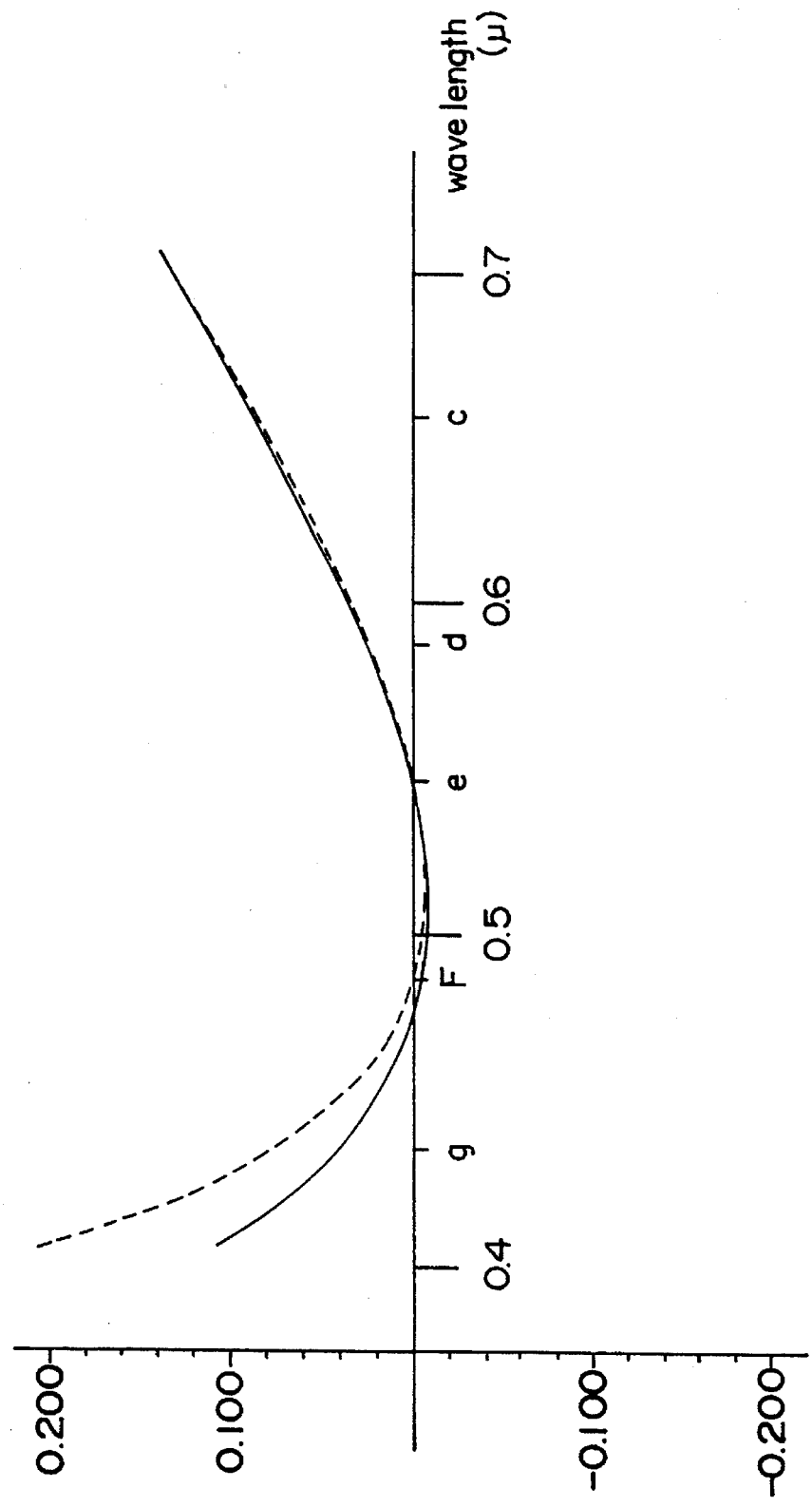

Surface No. 6
$\theta (g,F)_P = 0.6153$
$\Delta \theta (g,F)_P = 0.0150$
Surface No. 7
$\theta (g,F)_N = 0.6100$
$\Delta \theta (g,F)_N = 0.0097$
Surface No. 8
$\theta (g,F)_P = 0.6153$
$\Delta \theta (g,F)_P = 0.0150$ The solid line in FIG. 11 represents the paraxial chromatic aberration for each wavelength band in the first embodiment. In the first embodiment, the chromatic aberration correcting lens group 13 is comprised of positive and negative lenses that are made of different types of glass material. The dotted line in FIG. 11 represents the paraxial chromatic aberration for each wavelength band when the chromatic aberration correcting lens group 13 is made of a single lens. As can be seen from FIG. 11, if the chromatic aberration correcting lens comprises of more than one glass lens which satisfy the formulae (1) through (3) and is positioned between the front lens and the rear lens, the chromatic aberration over a wide range of wavelengths can be effectively corrected.

The paraxial chromatic aberration can also be effectively corrected in the second through fifth embodiments of the present invention, similar to the first embodiment. Note that the dotted line in FIG. 11 is replaced with an oblique curve for the aberration correcting lens which is made of a single lens in the second and third embodiments.

The values of the formulae (1) through (5) in the first through fifth embodiments are shown in Table 6 below.

TABLE 6

|  | embodiment 1 | embodiment 2 | embodiment 3 | embodiment 4 | embodiment 5 |
| --- | --- | --- | --- | --- | --- |
| formula (1) | 0.0 | 0.5 | 2.8 | 0.0 | 0.0 |
| formula (2) | 0.0 | 0.00002 | 0.00317 | 0.0 | 0.0 |
| formula (3) | 1.55 | 1.74 | 2.20 | 1.55 | 1.55 |
| formula (4) | 6.8 | 4.0 | 3.8 | 6.8 | 6.8 |
| formula (5) | 0.00 | 0.00 | 0.02 | 0.00 | 0.00 |

As can be seen from Table 6 above, all of the five embodiments satisfy the requirements defined by the formulae (1) through (5), moreover, according to the present invention, the various aberrations shown in aberration diagrams, and particularly the axial chromatic aberration as well as the off-axis chromatic aberration can be effectively corrected over a wide range of wavelengths.

We claim:

1. An achromatic lens system comprising a front lens group, a chromatic aberration correcting lens group and a rear lens group, arranged in this order from the object side, wherein the aberrations including spherical aberration, coma, astigmatism, curvature of image as well as the axial chromatic aberration of wavelengths from green to red are substantially corrected by said front lens group and said rear lens group, and, wherein the positive axial chromatic aberration of the wavelength blue caused by said front lens group and said rear lens group, is corrected by said chromatic aberration correcting lens group.

2. An achromatic lens system according to claim 1, said chromatic aberration correcting lens group including at least one positive lens and one negative lens that satisfy the following relationships;

$$|v_P - v_N| < 5.0 \quad (1)$$

$$|N_P - N_N| < 0.01 \quad (2)$$

$$1 < (\Delta\theta(g,F)_P)/(\Delta\theta(g,F)_N) < 10 \quad (3)$$

wherein $v_P$: Abbe's number of a d-line of said positive lens of said chromatic aberration correcting lens group;

$v_N$: Abbe's number of a d-line of said negative lens of said chromatic aberration correcting lens group;

$N_P$: refractive index of a d-line of said positive lens of said chromatic aberration correcting lens group;

$N_N$: refractive index of a d-line of said negative lens of said chromatic aberration correcting lens group;

$\Delta\theta(g,F)_P$: deviation of a partial dispersion ratio of a g-F lines of said positive lens of said chromatic aberration correcting lens group, from a standard line;

$\Delta\theta(g,F)_N$: deviation of a partial dispersion ratio of a g-F lines of said negative lens of said chromatic aberration correcting lens group, from a standard line.

3. An achromatic lens system according to claim 1, said achromatic lens system is adopted for use in a color image reading lens system.

4. An achromatic lens system according to claim 2, a relationship defined by the following formulae is satisfied $$2 < f/f_{C\text{-}P} < 10 \quad (4)$$

$$f/f_{C\text{-}P} + f/f_{C\text{-}N} < 0.1 \quad (5)$$

wherein f: resultant focal length of said achromatic lens system;

$f_{C\text{-}P}$: resultant focal length of said positive lens of said chromatic aberration correcting lens group;

$f_{C\text{-}N}$: resultant focal length of said negative lens of said chromatic aberration correcting lens group.

5. An achromatic lens system comprising a front lens group, a chromatic aberration correcting lens group and a rear lens group, arranged in this order from the object side, wherein the aberrations including spherical aberration, coma, astigmatism, curvature of image as well as the axial chromatic aberration of wavelengths from green to red are substantially corrected by said front lens group and said rear lens group, and, wherein the axial chromatic aberration of the wavelength blue, caused by said front lens group and said rear lens group, is corrected by said chromatic aberration correcting lens group, said chromatic aberration correcting lens group including at least one positive lens and one negative lens that satisfy the following relationships:

$$|v_P - v_N| < 5.0$$

$$|N_P - N_N| < 0.0$$

$$1 < (\Delta\theta(g,F)_P)/(\Delta\theta(g,F)_N) < 10$$

wherein $v_P$ represents Abbe's number of a d-line of said positive lens of said chromatic aberration correcting lens group;

$v_N$ represents Abbe's number of a d-line of said negative lens of said chromatic aberration correcting lens group;

$N_P$ represents a refractive index of a d-line of said positive lens of said chromatic aberration correcting lens group;

$N_N$ represents a refractive index of a d-line of said negative lens of said chromatic aberration correcting lens group;

$\Delta\theta(g,F)_P$ represents deviation of a partial dispersion ratio of g-F lines of said positive lens of said chromatic aberration correcting lens group, from a standard line; and $\Delta\theta(g,F)_N$ represents deviation of a partial dispersion ratio of g-F lines of said negative lens of said chromatic aberration correcting lens group, from a standard line; and said chromatic aberration correcting lens group consisting of said positive lens and said negative lens, arranged in this order with respect to the object side.

6. An achromatic lens system according to claim 5, said positive lens and said negative lens are cemented together.

7. An achromatic lens system comprising a front lens group, a chromatic aberration correcting lens group and a rear lens group, arranged in this order from the object side, wherein the aberrations including spherical aberration, coma, astigmatism, curvature of image as well as the axial chromatic aberration of wavelengths from .green to red are substantially corrected by said front lens group and said rear lens group, and, wherein the axial chromatic aberration of the wavelength blue, caused by said front lens group and said rear lens group, is corrected by said chromatic aberration correcting lens group, said chromatic aberration correcting lens group including at least one positive lens and one negative lens that satisfy the following relationships:

$|v_P - v_N| < 5.0$ $|N_P - N_N| < 0.01$ $1 < (\Delta\theta(g,F)_P)/(\Delta\theta(g,F)_N) < 10$ wherein $v_P$ represents Abbe's number of a d-line of said positive lens of said chromatic aberration correcting lens group;

$v_N$ represents Abbe's number of a d-line of said negative lens of said chromatic aberration correcting lens group;

$N_P$ represents refractive index of a d-line of said positive lens of said chromatic aberration correcting lens group;

$N_N$ represents refractive index of a d-line of said negative lens of said chromatic aberration correcting lens group;

$\Delta\theta(g,F)_P$ represents deviation of a partial dispersion ratio of g-F lines of said positive lens of said chromatic aberration correcting lens group, from a standard line; and $\Delta\theta(g,F)_N$ represents deviation of a partial dispersion ratio of g-F lines of said negative lens of said chromatic aberration correcting lens group, from a standard line; and said chromatic aberration correcting lens group consisting of said negative lens and said positive lens, arranged in this order with respect to the object side.

8. An achromatic lens system according to claim 7, said negative lens and said positive lens are cemented together.

9. An achromatic lens system comprising a front lens group, a chromatic aberration correcting lens group and a rear lens group, arranged in this order from the object side, wherein the aberrations including spherical aberration, coma, astigmatism, curvature of image as well as the axial chromatic aberration of wavelengths from green to red are substantially corrected by said front lens group and said rear lens group, and, wherein the axial chromatic aberration of the wavelength blue, caused by said front lens group and said rear lens group, is corrected by said chromatic aberration correcting lens group;

said chromatic aberration correcting lens group consisting of a first positive lens, a second negative lens and a third positive lens with respect to the object side that satisfy the following relationships:

$|v_P - v_N| < 5.0$ $N_P - N_N| < 0.01$ $1 < (\Delta\theta(g,F)_P)/(\Delta\theta(g,F)_N) < 10$ wherein $v_P$ represents Abbe's number of a d-line of said positive lens of said chromatic aberration correcting lens group;

$v_N$ represents Abbe's number of a d-line of said negative lens of said chromatic aberration correcting lens group;

$N_P$ represents refractive index of a d-line of said positive lens of said chromatic aberration correcting lens group;

$N_N$ represents refractive index of a d-line of said negative lens of said chromatic aberration correcting lens group;

$\Delta\theta(g,F)_P$ represents deviation of a partial dispersion ratio of g-F lines of said positive lens of said chromatic aberration correcting lens group, from a standard line;

$\Delta\theta(g,F)_N$ represents deviation of a partial dispersion ratio of g-F lines of said negative lens of said chromatic aberration correcting lens group, from a standard line.

10. An achromatic lens system according to claim 9, said first positive lens, said second negative lens and said third positive lens are cemented together.

11. An achromatic lens system according to claim 9, a relationship defined by the following formulae is satisfied $2 < f/f_{C-P} < 10$ \hfill (4)

$f/f_{C-P} + f/f_{C-N} < 0.1$ \hfill (5)

wherein $f$: resultant focal length of said achromatic lens system;

$f_{C-P}$: resultant focal length of both said positive lenses of said chromatic aberration correcting lens group;

$f_{C-N}$: resultant focal length of said negative lens of said chromatic aberration correcting lens group.

12. An achromatic lens system according to claim 9, said chromatic aberration correcting lens group is symmetrical with respect to a center of said negative lens.

13. An achromatic lens system comprising a front lens group, a chromatic aberration correcting lens group and a rear lens group, arranged in this order from the object side, wherein the aberrations including spherical aberration, coma, astigmatism, curvature of image as well as the axial chromatic aberration of wavelengths from green to red are substantially corrected by said front lens group and said rear lens group, and, wherein the axial chromatic aberration of the wavelength blue, caused by said front lens group and said rear lens group, is corrected by said chromatic aberration correcting lens group; and said chromatic aberration correcting lens group consisting of a first negative lens, a second positive lens and a third negative lens with respect to the object side that satisfy the following relationships:

$|v_P - v_N|5.0$ \hfill (1)

$|N_P - N_N| < 0.01$ \hfill (2)

$1 < (\Delta\theta(g,F)_P)/(\Delta\theta(g,F)_N) < 10$ \hfill (3)

wherein $v_P$ represents Abbe's number of a d-line of said positive lens of said chromatic aberration correcting lens group;

$v_N$ represents Abbe's number of a d-line of said negative lens of said chromatic aberration correcting lens group;

$N_P$ represents refractive index of a d-line of said positive lens of said chromatic aberration correcting lens group;

$N_N$ represents refractive index of a d-line of said negative lens of said chromatic aberration correcting lens group;

$\Delta\theta(g,F)_P$ represents deviation of a partial dispersion ratio of g-F lines of said positive lens of said chromatic aberration correcting lens group, from a standard line;

$\Delta\theta(g,F)_N$ represents deviation of a partial dispersion ratio of a g-F lines of said negative lens of said chromatic aberration correcting lens group, from a standard line.

14. An achromatic lens system according to claim 13, said first negative lens, said second positive lens and said third negative lens are cemented together.

15. An achromatic lens system according to claim 13, a relationship defined by the following formulae is satisfied $$2<f/f_{C\text{-}P}<10 \qquad (4)$$

$$f/f_{C\text{-}P}+f/f_{C\text{-}N}<0.1 \qquad (5)$$

wherein f: resultant focal length of said achromatic lens system;

$f_{C\text{-}P}$: resultant focal length of said positive lens of said chromatic aberration correcting lens group;

$f_{C\text{-}N}$: resultant focal length of both said negative lenses of said chromatic aberration correcting lens group.

16. An achromatic lens system according to claim 13, said chromatic aberration correcting lens group is symmetrical with respect to a center of said positive lens.

17. An achromatic lens system according to claim 16, said chromatic aberration correcting lens group is a cemented lens.

18. An achromatic lens system comprising a front lens group, a chromatic aberration correcting lens group, and a rear lens group, arranged in this order from an object side, said chromatic aberration correcting lens group comprises a positive lens and a negative lens that satisfy the following relationships:

$$|v_P-v_N|<5.0$$

$$|N_P-N_N|<0.01$$

$$1<(\Delta\theta(g,F)_P)/(\Delta\theta(g,F)_N)<10$$

$$2<f/f_{C\text{-}P}<10$$

$$f/f_{C\text{-}P}+f/f_{C\text{-}N}<0.1$$

wherein $v_P$ represents Abbe's number of a d-line of said positive lens of said chromatic aberration correcting lens group;

$v_N$ represents Abbe's number of a d-line of said negative lens of said chromatic aberration correcting lens group;

$N_P$ represents refractive index of a d-line of said positive lens of said chromatic aberration correcting lens group;

$N_N$ represents refractive index of a d-line of said negative lens of said chromatic aberration correcting lens group;

$\Delta\theta(g,F)_P$ represents deviation of a partial dispersion ratio of a g-F lines of said positive lens of said chromatic aberration correcting lens group, from a standard line;

$\Delta\theta(g,F)_N$ represents deviation of a partial dispersion ratio of a g-F lines of said negative lens of said chromatic aberration correcting lens group, from a standard line;

f represents a focal length of said achromatic lens system;

$f_{C\text{-}P}$ represents a resultant focal length of said positive lenses of said chromatic aberration correcting lens group;

$f_{C\text{-}N}$ represents a resultant focal length of said negative lenses of said chromatic aberration correcting lens group.

19. An achromatic lens system according to claim 18, said chromatic aberration correcting lens group is symmetrical with respect to a center of a central lens thereof.

20. An achromatic lens system according to claim 18, said chromatic aberration correcting lens group is a cemented lens.

21. An achromatic lens system according to claim 18, said chromatic aberration correcting lens group is arranged in a middle of said achromatic lens system.

22. An achromatic lens system including a chromatic aberration correcting lens group, said chromatic aberration correcting lens group comprises a first positive lens, a second negative lens and a third positive lens arranged in this order with respect to the object side that satisfy the following relationship;

$$|v_P-v_N|<5.0 \qquad (1)$$

$$|N_P-N_N|<0.01 \qquad (2)$$

$$1<(\Delta\theta(g,F)_P)/(\Delta\theta(g,F)_N)<10$$

wherein $v_P$: Abbe's number of a d-line of said positive lens of said chromatic aberration correcting lens group;

$v_N$: Abbe's number of a d-line of said negative lens of said chromatic aberration correcting lens group;

$N_P$: refractive index of a d-line of each said positive lens of said chromatic aberration correcting lens group;

$N_N$: refractive index of a d-line of said negative lens of said chromatic aberration correcting lens group;

$\Delta\theta(g,F)_P$: deviation of a partial dispersion ratio of a g-F lines of each said positive lens of said chromatic aberration correcting lens group, from a standard line;

$\Delta\theta(g,F)_N$: deviation of a partial dispersion ratio of a g-F lines of said negative lens of said chromatic aberration correcting lens group, from a standard line.

23. An achromatic lens system according to claim 22, a relationship defined by the following formulae:

$$2<f/f_{C\text{-}P}<10 \qquad (4)$$

$$f/f_{C\text{-}P}+f/f_{C\text{-}N}<0.1 \qquad (5)$$

wherein f: resultant focal length of said achromatic lens system;

$f_{C\text{-}P}$: resultant focal length of said positive lenses of said chromatic aberration correcting lens group;

$f_{C\text{-}N}$: resultant focal length of said negative lenses of said chromatic aberration correcting lens group.

24. An achromatic lens system according to claim 22, said chromatic aberration correcting lens group is symmetrical with respect to a center of a central lens thereof.

25. An achromatic lens system according to claim 22, said chromatic aberration correcting lens group is a cemented lens.

26. An achromatic lens system according to claim 22, said chromatic aberration correcting lens group is arranged in a middle of said achromatic lens system.

27. An achromatic lens system including a chromatic aberration correcting lens group, said chromatic aberration correcting lens group comprises a first negative lens, a second positive lens and a third negative lens arranged in this order with respect to the object side that satisfy the following relationship:

$$|v_P-v_N|<5.0 \qquad (1)$$

$$|N_P - N_N| < 0.01 \tag{2}$$

$$1 < (\Delta\theta(g,F)_P)/(\Delta\theta(g,F)_N) < 10 \tag{3}$$

wherein $\nu_P$: Abbe's number of a d-line of said positive lens of said chromatic aberration correcting lens group;

$\nu_N$: Abbe's number of a d-line of each said negative lens of said chromatic aberration correcting lens group;

$N_P$: refractive index of a d-line of said positive lens of said chromatic aberration correcting lens group;

$N_N$: refractive index of a d-line of each said negative lens of said chromatic aberration correcting lens group;

$\Delta\theta(g,F)_P$: deviation of a partial dispersion ratio of a g-F lines of each said positive lens of said chromatic aberration correcting lens group, from a standard line;

$\Delta\theta(g,F)_N$: deviation of a partial dispersion ratio of a g-F lines of said negative lens of said chromatic aberration correcting lens group, from a standard line.

28. An achromatic lens system according to claim 27, a relationship defined by the following formulae is satisfied $$2 < f/f_{C-P} < 10 \tag{4}$$

$$f/f_{C-P} + f/f_{C-N} < 0.1 \tag{5}$$

wherein f: resultant focal length of said achromatic lens system;

$f_{C-P}$: resultant focal length of said positive lenses of said chromatic aberration correcting lens group;

$f_{C-N}$: resultant focal length of said negative lenses of said chromatic aberration correcting lens group.

29. An achromatic lens system according to claim 27, said chromatic aberration correcting lens group is arranged in a middle of said achromatic lens system.

* * * * *

UNITED STATES PATENT AND TRADEMARK OFFICE
CERTIFICATE OF CORRECTION

PATENT NO. : 5,568,325  Page 1 of 2
DATED : October 22, 1996
INVENTOR(S) : H. HIRANO et al.

It is certified that error appears in the above-indentified patent and that said Letters Patent is hereby corrected as shown below:

At column 9, line 28 (claim 1, line 10), change "blue" to ---blue,---.

At column 9, line 34 (claim 2, line 4), change ";" to ---:---.

At column 9, line 62 (claim 4, line 2), change "satisfied" to ---satisfied:---.

At column 10, line 37 (claim 5, line 16), change "0.0" to ---0.01---.

At column 11, line 3 (claim 7, line 6), change ".green" to ---green---.

At column 12, line 17 (claim 11, line 2), change "satisfied" to ---satisfied:---.

At column 13, line 8 (claim 15, line 2), change "satisfied" to ---satisfied:---.

At column 14, line 12 (claim 22, line 6), change "relationship;" to ---relationships:---.

UNITED STATES PATENT AND TRADEMARK OFFICE
CERTIFICATE OF CORRECTION

PATENT NO. : 5,568,325

DATED : October 22, 1996

INVENTOR(S) : H. HIRANO et al.

It is certified that error appears in the above-indentified patent and that said Letters Patent is hereby corrected as shown below:

At column 14, line 64 (claim 27, line 6), change "relationship:" to ---relationships:---.

At column 16, line 2 (claim 28, line 2), change "satisfied" to ---satisfied:---.

Signed and Sealed this

Fourth Day of February, 1997

Attest:

BRUCE LEHMAN

Attesting Officer

Commissioner of Patents and Trademarks